Figure 1:
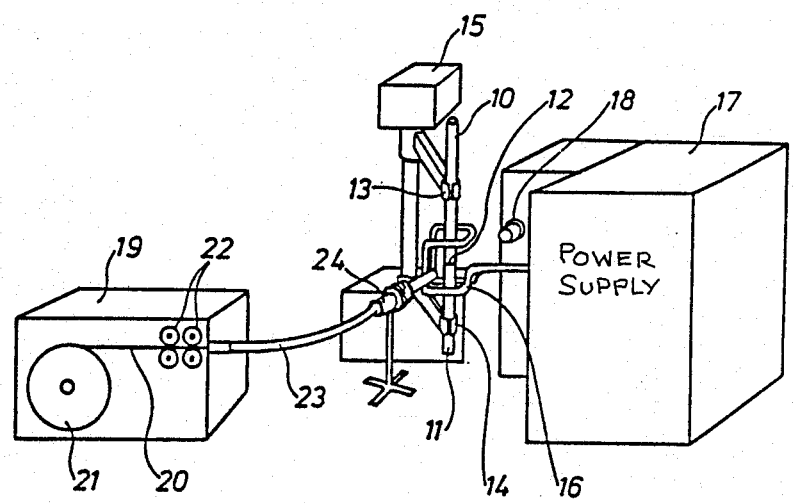

United States Patent [19]

Peterson

[11] Patent Number: 4,822,971
[45] Date of Patent: Apr. 18, 1989

[54] METHOD AND DEVICE FOR SOLDERING OR BRAZING

[75] Inventor: Christer C. I. Peterson, Stockholm, Sweden

[73] Assignee: Aktiebolaget Electrolux, Stockholm, Sweden

[21] Appl. No.: 36,582

[22] Filed: Apr. 10, 1987

[30] Foreign Application Priority Data

Apr. 29, 1986 [SE] Sweden ................................ 8601977

[51] Int. Cl.⁴ .............................................. B23K 13/00
[52] U.S. Cl. ................... 219/85.22; 219/9.5; 219/85.11
[58] Field of Search ..................... 219/9.5, 85 A, 85 D, 219/85 BA, 85 BM, 85 M, 85 R; 228/51, 53, 229, 131, 132, 134

[56] References Cited

U.S. PATENT DOCUMENTS

| | | | |
|---|---|---|---|
| 2,180,168 | 12/1957 | Nyborg | 219/85 R X |
| 3,517,150 | 6/1970 | McIntosh et al. | 219/85 A X |
| 3,963,162 | 6/1976 | Taguchi et al. | 228/134 |
| 3,963,897 | 6/1976 | Wakita et al. | 228/53 X |
| 4,294,393 | 10/1981 | Weld | 228/134 |
| 4,401,878 | 8/1983 | Roen | 219/137.31 |

FOREIGN PATENT DOCUMENTS

| | | | |
|---|---|---|---|
| 650146 | 10/1962 | Canada | 219/85 R |
| 0041430 | 12/1981 | European Pat. Off. | 219/85 M |
| 3023237 | 1/1982 | Fed. Rep. of Germany | 228/132 |

Primary Examiner—Teresa J. Walberg
Attorney, Agent, or Firm—Alfred E. Miller

[57] ABSTRACT

A device and method for joining details by soldering or brazing preferably pipe-shaped articles by feeding solder through a nozzle to a tool and heating the tool by inductive heating to warm up the solder to a predetermined temperature for effecting the soldering or brazing operation. The nozzle is exposed to inductive heating thereby preheating the solder in the nozzle to a suitable temperature.

8 Claims, 1 Drawing Sheet

METHOD AND DEVICE FOR SOLDERING OR BRAZING

This invention relates to a method for joining details by soldering or brazing, preferably pipe shaped details, a solder being fed through a nozzle to a tool and the tool by means of inductive heating warming up the details to a predeterminded temperature for effecting the soldering or brazing operation and a device for realizing the method.

Soldering or brazing are well-known methods which have been widely used to join different metal details. Thus, the details are joined by heating one or both details after which a solder having a lower melting point than the metal from which the details are produced is supplied at the joint whereby the heated surfaces melt the solder so that it flows out between the surfaces, and when cooling joins the details to each other.

Soldering comprises the use of a solder having a melting point of 200°–200° C. whereas brazing presupposes the use of a solder having a melting point of about 700°–900° C. When brazing usually a silver solder having a melting point of about 700° C. is used which means that the details being joined have to be heated to about 800° C. before brazing can be effected. However, silver solder is expensive and for cost reasons it is sometimes preferred to use cheaper types of solder for instance, so-called phosphor-copper solder. When brazing steel, the solder together with the steel however forms a brittle phase iron-phosphite limiting the use of the cheaper solder.

In order to heat details both when soldering and brazing different types of methods are used, for instance gas burners, electric resistance heating, inductive heating and so on. In order to employ brazing as a production method for automatic manufacture certain equipment is suggested in EP publication No. 41430. This equipment comprises a device for inductive heating of the work pieces which are to be joined by the solder and which is wound on a reel and automactically supplied to the joining area. In said publication it is mentioned that it is desirable not to supply the solder when it is cold, and a method for heating the solder has been described. According to this method current is conducted via a transformer through the solder to the work pieces when the solder contacts it.

A main object of this invention is to achieve a simplified heating of the solder before it is supplied at the joining area compared to said publication. Thus, it has provided that by such a method it is possible to control the brazing process more careful than before and limit the temperature of the work pieces so that they are not damaged during brazing. The method can for instance be used to join copper plated steel pipes by means of silver-phosphor-copper solder when manufacturing pipe systems in which a cooling medium is circulated in refrigerators and freezers without running the risk of burning the thin copper layer during the brazing operation.

Figure 2:
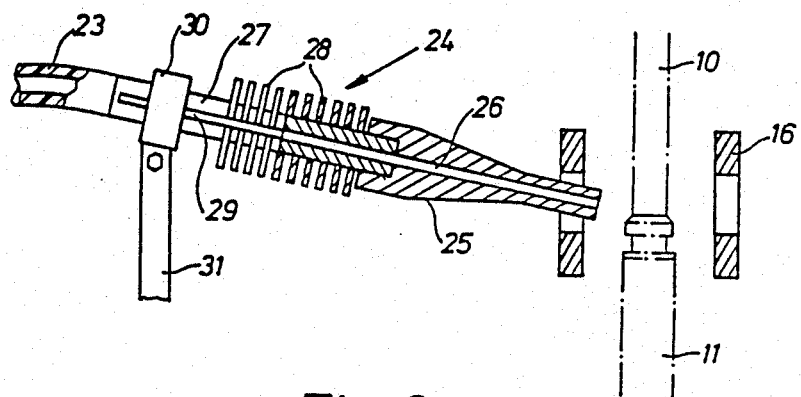

An embodiment of the invention will now be described with reference to the accompanying drawing where FIG. 1 is a perspective view which diagramatically shows an equipment where the invention is intended to be used, whereas FIG. 2 is an enlarged section of the nozzle through which the solder is fed to the brazing area.

In FIG. 1, the reference numerals 10 and 11 respectively are two pipes which are to be brazed to each other at a joining area. These pipes are kept close to each other by support devices 13, 14 maintain in a handling device 15 which is provided with arms so that the support devices are turnable in order to automatically deliver and pick up new pieces of pipe's not shown. The support devices are by means of the handling device moved to such a position that the pieces are placed vertically in superposed relationship in an induction coil 16 which during the brazing phase is fed with high frequency alternate voltage from a power supply unit 17. The temperature of the pieces is detected by means of a sensing device 18 which is electrically connected to the power supply unit and controls the heating so that the temperature is kept within a predetermined temperature interval. The equipment also comprises a device 19 for feeding the solder 20 to the brazing area, the solder being wound on a reel 21 and by means of feeding rollers 22 being supplied into a hose 23 which continues to a nozzle 24.

The construction of the nozzle 24 is shown in detail in FIG. 2. The nozzle comprises a front, partly conically, part 25 having a central hole 26 in which the solder is fed. The part 25 is connected to a pipe 27 having several cooling flanges 28 the pipe being connected to the hose 23 in which the solder is fed from the feeding device 19. The pipe 27 has one or several axial slots 29 which serve to prevent that the magnetic field which is created by the coil 16 creates an inductive current in the pipe 27.

The nozzle is supported by a holer 30 which is fastened to a stand 31. The holder 30 an the hose 23 consists of an electrically insulated material preferably plastics whereas the nozzle 24 consists of electrically conductive material preferably austenite stainless steel. The front part 25 of the nozzle is inserted into the inductive coil 16 so that it is influenced by the variations of the magnetic field in the coil.

Brazing with the equipment is effected in the following way.

The two pieces which are to be joined are by means of the handling device 15 brought to position in the induction coil 16 after which the inductive heating is switched on. This means a quick heating of the end parts of the pipes and of the front part of the nozzle 24. When heating the front part of the nozzle also the solder in the nozzle will be heated, the shape of the nozzle being such that a suitable temperature of the solder, that is in the range of 500°–600° C., is achieved. When the sensing device 18 indicates that a predetermined temperature of the work pieces has been achieved the solder 20 is automatically fed to the brazing area by means of the solder feeding device 19, the solder when contacting the work pieces immediately flowing out and by means of capillary effect penetrating between the surface which are to be joined. Then the induction coil is switched off which means that the work piece and the nozzle cools before the joint pipe by means of the handling device is taken away from the induction coil.

Designing the nozzle has to be made with great care taking into account that the heating of the nozzle must not damage the holder 30 or the hose 23. This means that the heat which is created at the narrow front part of the nozzle is allowed to spread into the larger cooling volume which creates the central part of the nozzle at the same time as the heat by means of the cooling flanges is conducted to the ambient and the creation of induction current in the rear part of the nozzle is prevented according to what has been said above.

Thus, by the suggested method the advantages is achieved that brazing can be effected without any risk that the cold solder slips off the heated work pieced, this being achieved without any further equipment for heating the solder.

I claim:

1. A device for joining members such as pipe-shaped elements comprising handling means for supporting a pipe-shaped elements in a soldering or brazing area, a rod-shaped solder member, a nozzle through which said solder member is fed, a single heating means comprising an inductive heating apparatus including an induction coil for heating said solder member and said pipe-shaped elements, the latter being heated to a temperature suitable for soldering or brazing, and said nozzle having a part thereof in said induction coil and said nozzle and the solder member therein being preheated to a predetermined temperature by said induction coil prior to the solder member being fed to said pipe-shaped elements in said soldering or brazing area, the temperature of said solder member being increased but the solder retaining its shape and solid form until it is melted upon contact with said pipe-shaped elements.

2. A device as claimed in claim 1 wherein said nozzle is provided with another part thereof for cooling.

3. A device as claimed in claim 2 wherein said other part is the rear part of said nozzle, said rear part having a plurality of slots for preventing the creation of induction currents in said rear part.

4. A device as claimed in claim 3 wherein said rear part additionally is provided with a plurality of cooling flanges.

5. A device as claimed in claim 1 wherein said heat conducting part of said nozzle decreases in cross-section toward the front thereof.

6. A device as claimed in claim 1 further comprising a holder for said nozzle including electrically insulated material.

7. A device as claimed in claim 1 wherein said nozzle has a heat conducting part fabricated of austenite stainless steel.

8. A method for joining pipes in an end-to-end manner comprising feeding a rod-shaped solder member through a nozzle to a work area for joining said pipes, inductively heating both said nozzle and said pipes with a single induction coil, and said nozzle being heated before the solder is fed to the pipes in the work area thereby preheating said solder in the nozzle while retaining its rod shape and solid form prior to soldering or brazing said pipes together.

* * * * *